United States Patent
Liu et al.

(10) Patent No.: US 10,289,336 B1
(45) Date of Patent: May 14, 2019

(54) RELOCATING DATA FROM AN END OF LIFE STORAGE DRIVE BASED ON STORAGE DRIVE LOADS IN A DATA STORAGE SYSTEM USING MAPPED RAID (REDUNDANT ARRAY OF INDEPENDENT DISKS) TECHNOLOGY

(71) Applicant: EMC IP Holding Company LLC, Hopkinton, MA (US)

(72) Inventors: Qingyun Liu, Beijing (CN); Jamin Kang, Beijing (CN); Shaoqin Gong, Beijing (CN); Ree Sun, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/888,647

(22) Filed: Feb. 5, 2018

(30) Foreign Application Priority Data

Jan. 31, 2018 (CN) .......................... 2018 1 0096203

(51) Int. Cl.
  *G06F 3/06* (2006.01)
(52) U.S. Cl.
  CPC .......... *G06F 3/0647* (2013.01); *G06F 3/0616* (2013.01); *G06F 3/0689* (2013.01)
(58) Field of Classification Search
  CPC .... G06F 3/0617; G06F 3/0619; G06F 3/0631; G06F 3/0634; G06F 3/0644; G06F 3/0647; G06F 3/0689; G06F 11/2069; G06F 11/2094; G06F 2201/805; G06F 2201/822
  USPC ................................. 711/114; 714/6.22, 6.3
  See application file for complete search history.

(56) References Cited

U.S. PATENT DOCUMENTS

| | | | |
|---|---|---|---|
| 5,579,475 A | 11/1996 | Blaum et al. | |
| 6,567,889 B1 | 5/2003 | DeKoning et al. | |
| 6,857,059 B2 | 2/2005 | Karpoff et al. | |
| 7,409,625 B2 | 8/2008 | Corbett et al. | |
| 10,089,026 B1 * | 10/2018 | Puhov | G06F 3/0619 |
| 10,152,254 B1 * | 12/2018 | Kang | G06F 3/0619 |
| 2004/0260967 A1 | 12/2004 | Guha et al. | |

(Continued)

OTHER PUBLICATIONS

Blaum, et al., "EVENODD: An Optical Scheme for Tolerating Double Disk Failures in RAID Architectures", RAID Architectures: IBM Research Report, RJ 9506, Sep. 1993, pp. 245-254.

(Continued)

*Primary Examiner* — Gary J Portka
(74) *Attorney, Agent, or Firm* — BainwoodHuang

(57) ABSTRACT

Technology for relocating data stored in an end of life source storage drive that identifies individual destination drive extents corresponding to drive extents located in the source storage drive by selecting individual storage drives within a set of healthy storage drives in a group of storage drives in a round robin manner and identifying an individual destination drive extent from each selected storage drive. The corresponding destination drive extents replace the drive extents located in the source storage drive, and are used to store data copied from the drive extents located in the source storage drive. Data is copied in parallel from a set of multiple drive extents located in the source storage drive that is selected based on the current total input/output load determined for each storage drive in the set of healthy storage drives, and on the storage drives on which the corresponding destination drive extents are located.

19 Claims, 8 Drawing Sheets

(56) References Cited

U.S. PATENT DOCUMENTS

| | | |
|---|---|---|
| 2006/0075283 A1 | 4/2006 | Hartung et al. |
| 2012/0096309 A1* | 4/2012 | Kumar .................... G06F 11/00 714/6.22 |
| 2012/0137065 A1 | 5/2012 | Odenwald et al. |
| 2018/0275894 A1* | 9/2018 | Yoshino ................ G06F 3/0616 |

OTHER PUBLICATIONS

Miller, Scott A., "Comparing RAID 10 and RAID 01", SMB IT Journal; Jul. 30, 2014; <<http://www.smbitjournal.com/2014/07/comparing-raid-10-and-raid-01/>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

\* cited by examiner

RELOCATING DATA FROM AN END OF LIFE STORAGE DRIVE BASED ON STORAGE DRIVE LOADS IN A DATA STORAGE SYSTEM USING MAPPED RAID (REDUNDANT ARRAY OF INDEPENDENT DISKS) TECHNOLOGY

TECHNICAL FIELD

The present disclosure relates generally to intelligent data storage systems that provide RAID (Redundant Array of Independent Disks) technology, and more specifically to technology for relocating data from an end of life storage drive based on storage drive loads in a data storage system that uses mapped RAID Technology.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify one or more storage objects (e.g. logical disks or "LUNs") that are to be written, read, created, or deleted. The storage processors run software that manages the received I/O operations and performs various data processing tasks to organize and secure the host data that is received from the host machines and stored on the non-volatile data storage devices.

Some existing data storage systems have provided RAID (Redundant Array of Independent Disks) technology. RAID is a data storage virtualization/protection technology that combines multiple physical drives into a single logical unit to provide data redundancy and/or performance improvement. Data written to the logical unit may be distributed across the drives in one of several ways, referred to as RAID levels, depending on the required levels of redundancy and performance. Some RAID levels employ data striping ("striping") to improve performance. In general, striping involves segmenting received host data into logically sequential blocks (e.g. sequential blocks in an address space of a logical storage object), and then storing data written to consecutive blocks in the logical sequence of blocks onto different drives. A series of consecutive logically sequential data blocks that are stored across different drives may be referred to as a RAID "stripe". By spreading data segments across multiple drives that can be accessed concurrently, total data throughput can be increased.

Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. Further in traditional RAID, a spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations may provide data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

Some storage processors in data storage systems are operable to perform certain actions in response to the receipt of error indications from the non-volatile data storage devices that are contained in or attached to the data storage system. In particular, some storage processors are operable to receive an error message from a data storage drive indicating that the state of the data storage drive is "end of life", and that the storage drive should accordingly be replaced. For example, some data storage drives operate by using an internal set of reserved sectors to transparently replace sectors that fail while I/O operations directed to the data storage drive are being processed. Each time a reserved sector is internally allocated by the data storage drive to replace a failed sector, the data storage drive successfully completes the requested I/O operation that caused the failure using the replacement sector, and may then report a completion status indicating that a "soft media error" has occurred. When the data storage drive has internally allocated all of its reserved sectors to replace failed sectors, the data storage drive may send an error message to the storage processor indicating that the state of the data storage drive is "end of life". Some previous storage processors have responded to receipt of an "end of life" message from a data storage drive by copying the entire set of data stored on the "end of life" data storage drive to a single replacement data storage drive.

As the capacity of modern hard disks has increased over time, responding to receipt of an "end of life" message from a data storage drive by copying the entire set of data stored on the data storage drive to a single healthy data storage drive has become prohibitively time consuming and resource intensive for storage processors of data storage systems.

SUMMARY

Data storage systems providing traditional RAID data protection have had significant limitations with regard to the ability to add new disks, and with regard to the amount of time required to rebuild data in the event of a disk failure. Specifically, traditional RAID systems do not support the addition of new disks on an individual disk basis, and instead require that new storage capacity be added only in numbers of disks equal to the number of disks that is required to support the specific RAID configuration, i.e. equal to the width of the RAID stripe being used. Accordingly, for traditional 4D+1P RAID-5 configurations, new disks can only be added to a traditional RAID system in increments of five disks at a time. For traditional 4D+2P RAID-6 configurations, new disks can only be added to traditional RAID systems in increments of six disks. As the capacity of individual disks has increased over time with the introduction of new storage technologies, this inflexibility in terms of adding new capacity to traditional RAID systems has become increasingly burdensome and impractical.

Also as individual disk capacity has increased, the time required by traditional RAID systems to rebuild data of an entire failed disk onto a single dedicated spare disk has increased, and the write bandwidth of the single dedicated spare disk has become a significant performance bottleneck with regard to a total rebuild time. Moreover, while data previously stored on the failed disk is being rebuilt on the spare disk, concurrent failure of one or more additional disks in a traditional RAID system during the rebuilding process may introduce the risk of data loss.

The mapped RAID technology described herein improves on traditional RAID technology by allowing for the addition of individual non-volatile data storage drives to a data storage system in order to increase the storage capacity of the system, and also addresses the problem of long rebuild times in traditional RAID caused by write bandwidth bottlenecks when writing to dedicated spare disks. In the mapped RAID technology described herein, each storage drive is divided into multiple contiguous regions of non-volatile data storage referred to as "drive extents". A drive extent pool is generated from the drive extents. The drive extent pool maintains indications of the drive extents, as well as indications of whether each individual drive extent has been allocated or is available for allocation. A RAID extent table is generated that contains multiple RAID extent entries, each one of which indicates a unique set of drive extents that have been allocated from the drive extent pool to that RAID extent entry. The set of drive extents indicated by each RAID extent entry are used to store host data that is written to a corresponding portion of a logical address space representing the non-volatile storage accessed through the RAID mapping table and associated parity data, e.g. to store the host data written to a corresponding portion of the logical address space of a logical storage object representing the non-volatile storage accessed through the RAID mapping table and associated parity data. Each one of the drive extents allocated to any individual RAID extent must be located on a different storage drive. The drive extents indicated by a RAID extent entry are used to store the blocks of data and the associated parity information for a stripe of non-volatile data storage represented by that RAID extent entry. The total number of drive extents indicated by each RAID extent entry in the RAID extent table may be the same as the number of disks used in a traditional RAID system to store data blocks and parity information for the same RAID level. For example, in a mapped RAID system supporting a 4D+1P RAID-5 configuration, each RAID extent entry in the RAID extent table indicates a total of five drive extents, four of which are used to store the four blocks of host data, and one of which is used to store the parity information of the stripe represented by the RAID extent. In a 4D+2P RAID-6 mapped RAID configuration, two parity information blocks are indicated by each RAID extent entry to provide an increased level of fault tolerance, and each RAID extent entry in the RAID extent table indicates a total of six drive extents.

In the event that a drive enters an end of life state and must be replaced, in the mapped RAID technology described herein spare drive extents can be allocated from the drive extent pool that are located on multiple storage drives that contribute to the drive extent pool in order to replace drive extents located in the failed drive. In this way the disclosed mapped RAID technology may advantageously increase parallel processing while copying data from the end of life storage drive by spreading the necessary write operations across multiple healthy storage drives, thus effectively eliminating a write bandwidth bottleneck previously that may be caused by traditional RAID's reliance on copying to a single dedicated spare disk, and reducing the time required to respond to a single drive reaching an end of life state.

In the technology described herein, in response to receipt of an end of life indication from a source storage drive within a group of storage drives, the storage processor relocates the data stored in the source storage drive by first identifying, for each drive extent located in the source storage drive, a corresponding destination drive extent to replace the drive extent located in the source storage drive. To identify the corresponding destination drive extent to replace each drive extent located in the source storage drive, the storage processor first selects, in a round robin manner, a next storage drive from within a set of healthy storage drives in the group of storage drives (e.g. a set of storage drives in the group of storage drives not including the storage drive from which the end of life indication was received), allocates a free drive extent that is located in the selected storage drive from the drive extent pool, and stores an indication of the allocated free drive extent in a list of corresponding destination drive extents.

After a corresponding destination drive extent has been identified for each drive extent located in the source storage drive (e.g. for each allocated drive extent located in the source storage drive), the storage processor generates a parallel copy list. The parallel copy list indicates multiple drive extents located in the source storage drive from which data is copied in parallel by the storage processor to the corresponding destination drive extents. The parallel copy list is generated by the storage processor based on current total I/O loads of the storage drives in the set of healthy storage drives, such that each one of the drive extents located in the source storage drive indicated by the parallel copy list has a corresponding destination drive extent located on a storage drive that has a lowest current total I/O load of all storage drives in the set of healthy storage drives at a time at which the indication of that drive extent located on the source storage drive is added to the parallel copy list.

In some embodiments, the storage processor generates the parallel copy list indicating drive extents located in the source storage drive from which data is copied by the storage processor in parallel to the corresponding destination drive extents by detecting that the parallel copy list is not full, e.g. that the total number of drive extents located in the source storage drive indicated by the parallel copy list is less than a maximum size of the parallel copy list. In response to detecting that the parallel copy list is not full, the storage processor then determines a current total I/O load for each storage drive in the set of healthy storage drives, and identifies a storage drive in the set of healthy storage drives that has a lowest current total I/O load. The storage processor then identifies a drive extent located in the source storage drive corresponding to a destination drive extent located in the storage drive that has the lowest current total I/O load, and adds, to the parallel copy list, an indication of the drive extent located in the source storage drive corresponding to the destination drive extent located in the storage drive that has the lowest current total I/O load.

In some embodiments, the storage processor determines the current total I/O load for each storage drive in the set of healthy storage drives at least in part by, for each storage drive in the set of healthy storage drives, determining a current host I/O load equal to a total number of host I/O operations currently being performed on the storage drive. Then for each storage drive in the set of healthy storage drives, the storage processor determines a current background I/O load equal to a total number of background I/O operations currently being performed on the storage drive. The background I/O operations are performed at a lower priority than the host I/O operations, such that host I/O operations are completed before background I/O operations. The background I/O operations may include the copy operations performed in parallel by the storage processor from the drive extents located in the source storage drive that are indicated by the parallel copy list to the previously identified corresponding destination drive extents. For each storage drive in the set of healthy storage drives, the storage processor may then determine a current total I/O load that is equal to a sum of the current host I/O load for the storage drive and the current background I/O load for the storage drive.

In some embodiments, the storage processor selects, in a round robin manner, a next storage drive from within the set of healthy storage drives by identifying a next storage drive in a predetermined sequential ordering of the storage drives in the set of healthy storage drives following a storage drive on which is located a drive extent that was last allocated as a destination drive extent.

In some embodiments, the predetermined sequential ordering of the storage drives in the set of healthy storage drives is an order of the numbers assigned to the slots into which the storage drives are connected within the array of storage drives that is communicably coupled to the storage processor.

In some embodiments, the storage processor selects, in a round robin manner, a next storage drive from within the set of healthy storage drives in part by, before allocating a drive extent that is located in an initially selected storage drive from the drive extent pool, determining whether any drive extent located in the initially selected storage drive was allocated to a RAID extent entry to which the drive extent located in the source storage drive was allocated. In response to determining that a drive extent located in the initially selected storage drive was allocated to a RAID extent entry to which the drive extent located in the source storage drive was also allocated, a next storage drive in the sequential ordering of the set of healthy storage drives may be selected following the initially selected storage drive, and a drive extent may be allocated that is located in that next selected storage drive.

In some embodiments, the storage processor may also detect that the parallel copy list is not full by detecting that a background I/O operation that copies data from a drive extent located in the source storage drive and indicated by the parallel copy list to the corresponding destination dive extent has completed.

In some embodiments, the end of life indication received from the source storage drive indicates that a threshold maximum number of reserved disk sectors in the source storage drive have been used to replace original disk sectors to which I/O operations were directed, in response to failures of the original disk sectors. The threshold maximum number of the reserved disk sectors may be equal to a total number of reserved disk sectors in the source storage drive.

Embodiments of the technology described herein may provide significant advantages over previous technical solutions. For example, embodiments of the technology described herein copies data from drive extents located in an end of life source storage drive to corresponding destination drive extents evenly distributed across the remaining healthy storage drives in the group of storage drives. As a result, embodiments of the technology described herein reduce the risk of a performance bottleneck occurring because data from drive extents located in the source storage drive is predominantly copied to destination drive extents located in a small number of the remaining healthy storage drives. The technology described herein also advantageously selects optimal RAID extents located in the source storage drive to be added to the parallel copy list, based on the current total I/O loads of the healthy storage drives within the group of storage drives, which provides load balancing of I/O operations across the healthy storage drives. The technology described herein may determine a current total I/O load for each healthy storage drive in the group of storage drives that includes both host I/O load and background JO load, in order to reflect the actual I/O load each storage drive. The technology described herein takes advantage of the increased parallelism provided by mapped RAID technology, thus improving copy performance and reducing overall copy time. By reducing the overall amount of time required to relocate data stored on a storage drive from which an end of life indication has been received, embodiments of the technology described herein reduce the risk of losing data by reducing the risk that a second storage drive will fail during the copy process.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described herein are provided only as examples, in order to illustrate various features and principles of the disclosed technology, and that the invention is broader than the specific embodiments described herein.

Figure 1:
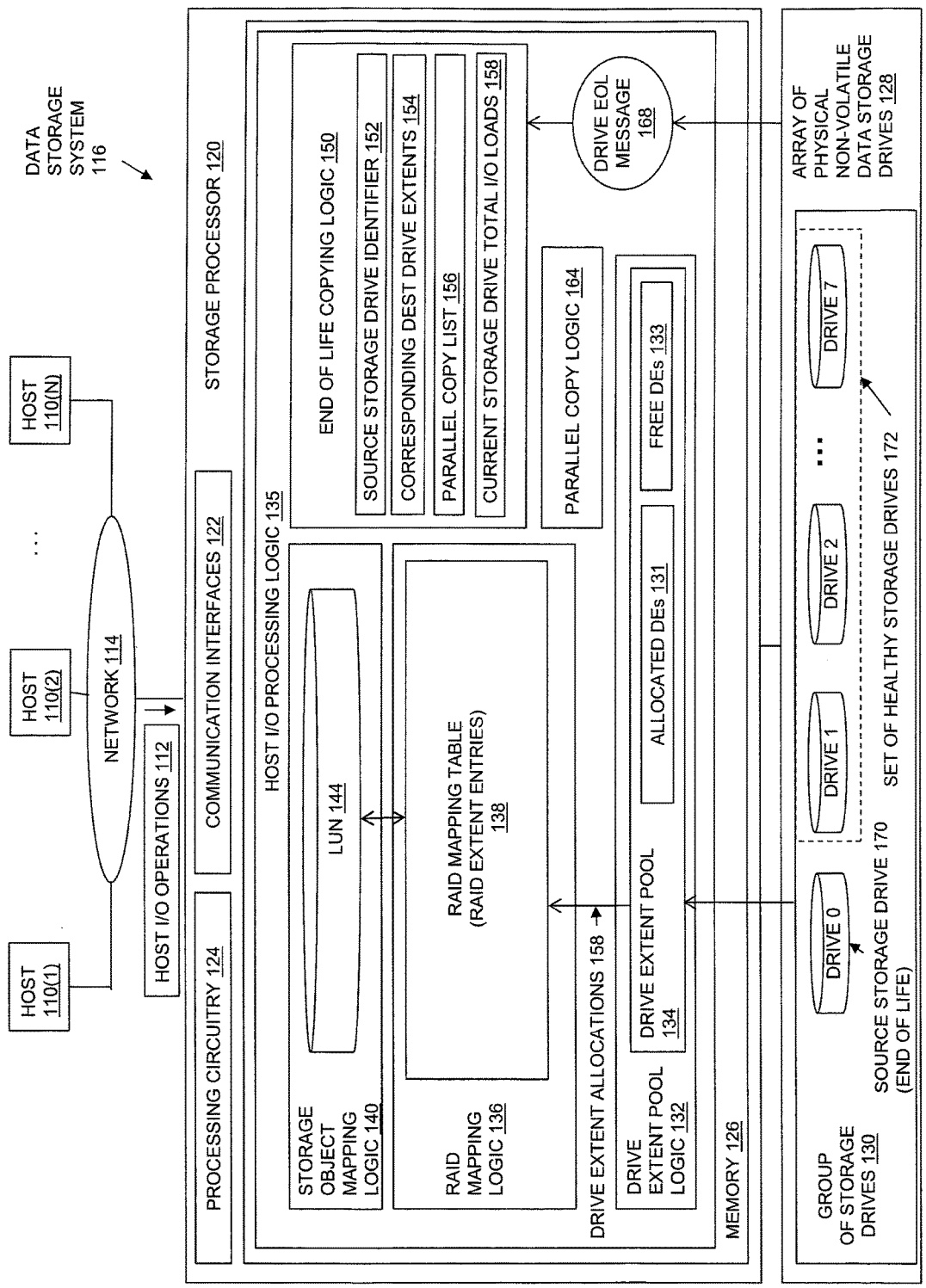
FIG. 1 is a block diagram showing an operational environment for the disclosed technology, including an example of a data storage system in which the disclosed technology may be embodied.

FIG. 1 is a block diagram showing an operational environment for the disclosed technology, including an example of a data storage system in which the disclosed technology may be embodied. The operational environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of device that is capable of processing host input/output (I/O) operations received from Hosts 110 (e.g. I/O read and I/O write operations, etc.).

The Array of Non-Volatile Data Storage Drives 128 may include physical data storage drives such as magnetic disk drives, solid state drives, hybrid drives, and/or optical drives. Array of Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 generates Drive Extent Pool 134 by first dividing each one of the physical data storage drives in the Initial Group of Storage Drives 130 into multiple, equal size drive extents, each of which consists of physically contiguous non-volatile data storage located on a drive. For example, Drive Extent Pool Logic 132 may divide each one of the physical data storage drives in the Array of Physical Non-Volatile Data Storage Devices 128 into a fixed number of equal size drive extents of physically contiguous non-volatile storage, and then store an indication of each one of the resulting drive extents to Drive Extent Pool 134. For example, each indication of a drive extent that is stored into Drive Extent Pool 134 may include a pair of indexes "m|n", in which "m" indicates a drive index of the storage drive on which the drive extent is located (e.g. a numeric drive number within Array of Physical Non-Volatile Storage Drives 128, a slot number within which the physical drive located, or a textual drive name, etc.), and "n" indicates an index of the drive extent within the storage drive (e.g. a numeric drive extent number, a block offset, a sector number, etc.). In embodiments in which storage drives are indexed within Array of Physical Non-Volatile Data Storage Devices 128 starting with 0, and in which drive extents are indexed within the storage drive that contains them starting with 0, a first drive extent of a first storage drive within Array of Physical Non-Volatile Data Storage Drives 128 may be represented by "0|0", a second drive extent within the first physical data storage drive within Array of Physical Non-Volatile Data Storage Drives 128 may be represented by "0|1", and so on. Drive Extent Pool Logic 132 may further maintain an allocation status for each one of the drive extents indicated in Drive Extent Pool 134, such that Drive Extent Pool 134 also stores, for each drive extent indicated by Drive Extent Pool 134, an indication of whether that drive extent has been allocated, or is instead available for allocation (e.g. an allocated bit flag or the like may be stored in Drive Extent Pool 134 for each drive extent). Accordingly, as shown in FIG. 1, the drive extents indicated by Drive Extent Pool 134 may each either be i) one of Allocated Drive Extents 131 that have been allocated to a RAID extent entry in the RAID Mapping Table 138, or ii) one of Free Drive Extents 133 that are unallocated "spare" drive extents available for future allocation to RAID extent entries in RAID Mapping Table 138, e.g. in response to an end of life indication received from a storage drive in the Group of Storage Drives 130, to replace, within RAID extent entries in RAID Mapping Table 138, drive extents located in the storage drive from which the end of life indication was received.

The Group of Storage Drives 130 from which Drive Extent Pool 134 is generated may consist of all the storage drives in Array of Physical Non-Volatile Data Storage Drives 128, or may be one of multiple groups of storage drives in Array of Physical Non-Volatile Data Storage Drives 128. Accordingly, the disclosed technology may be embodied or configured such that Array of Physical Non-Volatile Data Storage Drives 128 includes multiple separate groups of storage drives.

The size of the drive extents into which each storage drive in the Group of Storage Drives 130 is divided is the same for every storage drive in the Group of Storage Drives 130. Various specific sizes of drive extents may be used. For example, in some embodiments each drive extent may have a size of 10 gigabytes. Larger or smaller drive extent sizes may be used in the alternative. Any specific number of storage drives may be contained in the Group of Storage Drives 130 and divided into equal size drive extents to generate Drive Extent Pool 134. The storage drives in the Group of Storage Drives 130 may each have the same physical capacity, or alternatively may have a variety of different physical capacities, resulting in different storage drives being divided into different numbers of equal size drive extents.

After dividing each one of the storage drives in the Group of Storage Drives 130 into multiple, equal size drive extents of physically contiguous non-volatile data storage, and storing indications of the drive extents to Drive Extent Pool 134, drive extents may be allocated at 158 from Drive Extent Pool 134 to specific RAID extent entries contained in RAID Mapping Table 138. Each one of the RAID extent entries in RAID Mapping Table 138 indicates a unique set of drive extents that are allocated from the Drive Extent Pool 134 to that RAID extent entry. The drive extents allocated to each RAID extent entry are used to store host data that is written to a corresponding portion (a "RAID extent") of a logical address space of the storage object LUN 144, as well as associated parity data. For example, in a 4D+1P RAID-5 configuration, five drive extents may be allocated from Drive Extent Pool 134 to each individual RAID extent entry contained in RAID Mapping Table 138. Subsequently, for each RAID extent entry, four of the five drive extents allocated to the RAID extent entry may be used to store host data that is directed to a portion of an address space of LUN 144 that corresponds to that specific RAID extent entry, and the fifth drive extent allocated to the RAID extent entry may be used to store parity data to be used to recover the host data stored on one of the other four drive extents in the event of a storage drive failure. Drive extents are allocated to RAID extent entries in the RAID Mapping Table 138 such that no two drive extents indicated by any single RAID extent entry are located in the same storage drive.

When a drive extent is allocated from Drive Extent Pool 134 to a RAID extent entry, an indication of the drive extent is stored in the RAID extent entry. For example, as mentioned above with reference to the indications of drive extents contained in the Drive Extent Pool 134, a drive extent allocated to a RAID extent entry may be indicated within that RAID extent entry by a pair of indexes "m|n" that are stored in the RAID extent entry, in which "m" indicates a drive index of the storage drive on which the drive extent is located (e.g. a numeric drive number within Array of Physical Non-Volatile Storage Drives 128, a slot number within which the physical drive located, or a textual drive name, etc.), and "n" indicates an index of the drive extent within the storage drive (e.g. a numeric drive extent number, a block offset, a sector number, etc.). In embodiments in which storage drives are indexed within Array of Physical Non-Volatile Data Storage Devices 128 starting with 0, and in which drive extents are indexed within the storage drive that contains them starting with 0, a first drive extent of a first physical data storage drive within Array of Physical Non-Volatile Data Storage Drives 128 may be represented in a RAID extent entry to which it is allocated by "0|0", a second drive extent within the first physical data storage drive within Array of Physical Non-Volatile Data Storage Drives 128 may be represented in a RAID extent entry to which it is allocated by "0|1", and so on.

Host I/O Processing Logic 135 may expose one or more logical storage objects to Hosts 110 for reading and/or writing host data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks sometimes referred to as "LUNs", such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing host data.

Storage Object Mapping Logic 140 may be embodied to direct host data written to individual portions of a logical address space of LUN 144, e.g. to discrete sets of consecutive blocks in the logical address space of LUN 144, to specific individual corresponding RAID extent entries in RAID Mapping Table 138. In this way the host data written to each set of consecutive blocks in the logical address space of LUN 144 is persistently stored in drive extents indicated by a RAID extent entry corresponding to those blocks, and parity information can be calculated and stored in at least one of the drive extents of the same RAID extent entry to support data recovery. For example, an address space of LUN 144 may be made up of a set of sequential, equal size logical blocks of address space. Each host write I/O operation may indicate a specific block to be written within the address space of the LUN 144, e.g. using a logical block number (e.g. a logical block address) or offset into LUN 144. In some embodiments, 4D+1P RAID-5 block level striping with distributed parity error protection may be used, with each RAID stripe consisting of four data blocks and a block of parity information, and each RAID stripe being represented by a single RAID extent entry and mapped to drive extents indicated by that RAID extent entry. In such embodiments, each RAID extent entry may indicate five drive extents. For each set of four consecutive blocks in the logical address space of LUN 144 that are mapped to a single RAID extent entry, host data may be striped across the drive extents indicated by that RAID extent entry by storing host data written to consecutive ones of the four consecutive blocks of the logical address space into different ones of four of the drive extents indicated by that RAID extent entry. Parity information may be calculated and stored in a fifth drive extent indicated by the RAID extent entry, e.g. as an XOR of the host data stored in the other four drive extents indicated by the RAID extent entry. In this way, host data stored in any one of the four drive extents indicated by the RAID extent entry that store host data can be recovered in the event of a failure of a physical data storage drive containing one of the four drive extents indicated by the RAID extent entry that store host data, for example by performing one or more XOR operations on the data stored in the three surviving drive extents indicated by the RAID extent entry that store host data, in combination with the parity information stored in the fifth drive extent indicated by the RAID extent entry.

During operation of the some embodiments, End of Life Copying Logic 150 may receive an end of life indication from a source storage drive in the Group of Storage Drives 130. For example, End of Life Copying Logic 150 may receive the Drive End of Life Message 168 from the Array of Physical Non-Volatile Data Storage Drives 128. Drive End of Life Message 168 may, for example be a message sent from Drive 0, indicating that Drive 0 has reached an end of life state. In the example of FIG. 1, Drive 0 has reached an end of life state, and Drive 0 is accordingly the Source Storage Drive 170.

In some embodiments, each storage drive in the Group of Storage Drives 130 may include an internal set of reserved sectors that it uses to transparently replace sectors it contains that fail while I/O operations are being processed. In such embodiments, each time a reserved sector is internally allocated by one of the storage drives in Group of Storage Drives 130 to replace a failed sector, the storage drive may complete the requested I/O operation that caused the failure using the replacement sector. When a storage drive in the Group of Storage Drives 130 has internally allocated some threshold maximum number of its reserved sectors to replace failed sectors, that storage drive may send an end of life message to the End of Life Copying Logic 150 indicating that the status of the storage drive is "end of life", and that the storage drive should be replaced. In some embodiments, the threshold maximum number of reserved disk sectors may be equal to a total number of reserved disk sectors in each individual storage drive in the Group of Storage Drives 130. Accordingly, in some embodiments, the Drive End of Life Message 168 received by End of Life Copying Logic 150 may indicate that a threshold maximum number of reserved disk sectors contained in Drive 0 have been used to internally replace failed disk sectors in Source Storage Drive 170 to which I/O operations were directed, that Drive 0 has therefore entered an end of life state, that data stored on drive extents located in Drive 0 therefore needs to be relocated, and that Drive 0 is accordingly Source Storage Drive 170.

In response to receipt of the Drive End of Life Message 168, End of Life Copying Logic 150 may store an indication of Source Storage Drive 170 as Source Storage Drive Identifier 152. For example, in the case where Source Storage Drive 170 is Drive 0, End of Life Copying Logic 150 may store an identifier of Drive 0 (e.g. "Drive 0") into Source Storage Drive Identifier 152.

Further in response to receipt of Drive End of Life Message 168, End of Life Copying Logic 150 relocates the data stored in Source Storage Drive 170 by first identifying, for each drive extent located in Source Storage Drive 170, a corresponding destination drive extent to replace the drive extent located in the Source Storage Drive 170, and to which the data stored in the drive extent located in Source Storage Drive 170 is to be copied. In some embodiments, End of Life Copying Logic 150 may identify a corresponding destination drive extent for each one of the drive extents located in Source Storage Drive 170 that has been allocated to a RAID extent entry in the RAID Mapping Table 138. Each corresponding destination drive extent used to replace a drive extent located in Source Storage Drive 170 must be located in one of the storage drives in the Group of Storage Drives 130 other than Source Storage Drive 170, e.g. must be located in one of the storage drives in the Set of Healthy Storage Drives 172 (e.g. in one of storage drives Drive 1, Drive 2, Drive 3, Drive 4, Drive 5, Drive 6, or Drive 7).

In order to identify a corresponding destination drive extent to replace each drive extent located in the Source Storage Drive 170, End of Life Copying Logic 150 selects, in a round robin manner, a next storage drive from within the Set of Healthy Storage Drives 172, allocates a free drive extent (e.g. one of the Free Drive Extents 133) that is located in the selected storage drive from the Drive Extent Pool 134, and stores an indication of the allocated drive extent in a list of corresponding destination drive extents, shown in FIG. 1 by Corresponding Destination Drive Extents 154. End of Life Copying Logic 150 may select, in a round robin manner, the next storage drive from within the Set of Healthy Storage Drives 172 by identifying a next storage drive in a predetermined sequential ordering of the storage drives in the Set of Healthy Storage Drives 172 following a storage drive in the Set of Healthy Storage Drives 172 on which is located a drive extent that was last allocated from Drive Extent Pool 134 as a destination drive extent. For example, in a case where, for a first drive extent located in Source Storage Drive 170, a drive extent located in Drive 1 was allocated as a destination drive extent, End of Life Copying Logic 150 may, for a second drive extent located in Source Storage Drive 170, select Drive 2 as a next storage drive from within the Set of Healthy Storage Drives 172, and then allocate as the destination drive extent corresponding to the second drive extent located in Source Storage Drive 170 a drive extent that is located in Drive 2. Similarly, End of Life Copying Logic 150 may, for a third drive extent located in Source Storage Drive 170, select Drive 3 as the next storage drive from within the Set of Healthy Storage Drives 172, and then allocate as the destination drive extent corresponding to the third drive extent located in Source Storage Drive 170 a drive extent that is located in Drive 3. In this way, End of Life Copying Logic 150 may continue selecting storage drives from within the Set of Healthy Storage Drives 172 in a round robin manner, and allocate a drive extent from each selected storage drive as a destination drive extent corresponding to a drive extent located in Source Storage Drive 170, such that after a destination drive extent is allocated that is located in Drive 7, Drive 1 is selected as the next storage drive, and continuing to select storage drives in the Set Healthy Storage Drives 172 on a round robin basis for each drive extent located in the Source Storage Drive 170 until a corresponding destination drive extent has been identified and allocated for each drive extent (e.g. for each allocated drive extent) that is located in Source Storage Drive 170.

In some embodiments, the predetermined sequential ordering of the storage drives in the Set of Healthy Storage Drives 172, on the basis of which next storage drives are selected on a round robin basis within the Set of Healthy Storage Drives 172, may be derived from the numbers of slots into which the storage drives in the Group of Storage Drive 130 are connected in the Array of Physical Non-Volatile Data Storage Drives 128. For example, slots into which storage drives are connected (e.g. physically inserted) within the Array of Physical Non-Volatile Data Storage Drives 128 may be sequentially numbered from 0 up to some maximum number. The storage drives in the Group of Storage Drives 130 may accordingly be connected to slots 0 through 7, and as a result have a sequential ordering of Drive 0, Drive 1, Drive 2, and so on through Drive 7, based on the specific slots into which the storage drives are connected.

While selecting, in a round robin manner, storage drives from within the Set of Healthy Storage Drives 172, End of Life Copying Logic 150 also ensures that no destination drive extent corresponding to a drive extent located in Source Storage Drive 170 is located on a storage drive on which another drive extent is located that is allocated to same RAID extent entry in the RAID Mapping Table 138 to which the drive extent located in the Source Storage Drive 170 is also allocated. In this way, End of Life Copying Logic 150 ensures that no two drive extents allocated to a single RAID extent entry are located in the same storage drive. Specifically, while selecting a next storage drive from within the Set of Healthy Storage Drives 172, and before allocating a free drive extent that is located in an initially selected storage drive from the drive extent pool, End of Life Copying Logic 150 determines whether any drive extent located in the initially selected storage drive was also allocated to a RAID extent entry to which the drive extent located in the Source Storage Drive 170 was allocated. In response to determining that a drive extent located in the initially selected storage drive was also allocated to the RAID extent entry to which the drive extent located in the Source Storage Drive 170 was allocated, a next storage drive is selected following the initially selected storage drive in the sequential ordering of the Set of Healthy Storage Drives 172, and a free drive extent may be allocated that is located in that next selected storage drive, so long as no drive extent in that storage drive was also allocated to the RAID extent entry to which the drive extent located in the Source Storage Drive 170 was allocated. End of Life Copying Logic 150 may continue to select next storage drives from the Set of Healthy Storage Drives 172 until a storage drive is selected on which no drive extent is located that was allocated to the RAID extent entry to which the drive extent located in the Source Storage Drive 170 was allocated.

After a corresponding destination drive extent has been identified and allocated for each drive extent located in the Source Storage Drive 170 (e.g. for each allocated drive extent located in the source storage drive), and indications of the identified corresponding destination drive extents have been stored in Corresponding Destination Drive Extents 154, End of Life Copying Logic 150 generates Parallel Copy List 156. Parallel Copy List 156 indicates a set of multiple drive extents that are located in the Source Storage Drive 170, and from which data is copied in parallel by the Parallel Copy Logic 164 to the corresponding destination drive extents, as indicated in Corresponding Destination Drive Extents 154. While in the example of FIG. 1, Parallel Copy Logic 164 is shown for purposes of illustration as part of Host I/O Processing Logic 135, Parallel Copy Logic 164 may also or alternatively include or consist of specialized hardware circuitry or other program code executing in Storage Processor 120 that is operable to perform some maximum number of background data copy operations in parallel from drive extents located in Source Storage Drive 170 to other storage drives in the Group of Storage Drives 130. The maximum number of background data copy operations that may be performed in parallel by Parallel Copy Logic 164 may be configurable by a system administrator or the like. The size of Parallel Copy List 156 is equal to the configured maximum number of background copy operations that may be performed in parallel by Parallel Copy Logic 164. For example, the maximum number of background copy operations that may be performed by Parallel Copy Logic 164 may be three, and accordingly the size of the Parallel Copy List 156 may be three, such that Parallel Copy List 156 is full when it contains indications of three drive extents located in the Source Storage Drive 170, and is not full when it contains indications of less than three drive extents located in the Source Storage Drive 170 from which data is being copied.

In order to generate Parallel Copy List 156, End of Life Copying Logic 150 adds indications of drive extents located in the Source Storage Drive 170 to Parallel Copy List 156 when Parallel Copy List 156 is not full, based on the current total I/O load of each storage drive in the Set of Healthy Storage Drives 172, and the specific storage drives on which are located the corresponding destination drive extents for the drive extents located in Source Storage Drive 170. The Parallel Copy List 156 is generated by End of Life Copying Logic 150 such that each one of the drive extents located in the Source Storage Drive 170 indicated by the Parallel Copy List 156 has a corresponding destination drive extent located on a storage drive in the Set of Healthy Storage Drives 172 that has a lowest current total I/O load of all storage drives in the Set of Healthy Storage Drives 172 at a time at which the indication of the drive extent located on the Source Storage Drive 170 is added to the Parallel Copy List 156.

In some embodiments, each time End of Life Copying Logic 150 detects that the Parallel Copy List 156 is not full, End of Life Copying Logic 150 determines the current total I/O load for each storage drive in the Set of Healthy Storage Drives 172. End of Life Copying Logic 150 then identifies a storage drive in the Set of Healthy Storage Drives 172 that has a lowest current total I/O load. End of Life Copying Logic 150 then identifies a drive extent located in Source Storage Drive 170 that corresponds to a destination drive extent that is located in the storage drive that has the lowest current total I/O load of the storage drives in the Set of Healthy Storage Drives 172. End of Life Copying Logic 150 then adds, to the Parallel Copy List 156, an indication of the drive extent located in Source Storage Drive 170 that corresponds to a destination drive extent that is located in the storage drive that has the lowest current total I/O load of the storage drives in the Set of Healthy Storage Drives 172.

In some embodiments, End of Life Copying Logic 150 determines a current total I/O load for each storage drive in the Set of Healthy Storage Drives 172 by first, for each storage drive in the Set of Healthy Storage Drives 172, determining a current host I/O load that is equal to a total number of host I/O operations currently being performed on that storage drive. End of Life Copying Logic 150 then determines a current background I/O load for each storage drive in the Set of Healthy Storage Drives 172 that is equal to a total number of background I/O operations currently being performed on that storage drive. In some embodiments, background I/O operations are performed at a lower priority than host I/O operations, such that host I/O operations are completed before background I/O operations are performed. Examples of background I/O operations may include the background copy operations performed in parallel by Parallel Copy Logic 164, that copy data from the drive extents located in Source Storage Drive 170 that are indicated in Parallel Copy List 156 to the corresponding destination drive extents, as indicated in Corresponding Destination Drive Extents 154. For each storage drive in the Set of Healthy Storage Drives 172, End of Life Copying Logic 150 then determines a current total I/O load that is equal to a sum of the current host I/O load for that storage drive and the current background I/O load for that storage drive.

In some embodiments, End of Life Copying Logic 150 may also detect that the Parallel Copy List 156 is not full by detecting that a background copy operation that copies data from a drive extent located in the Source Storage Drive 172 indicated by the Parallel Copy List 156, to the corresponding destination dive extent, has completed.

Figure 2:
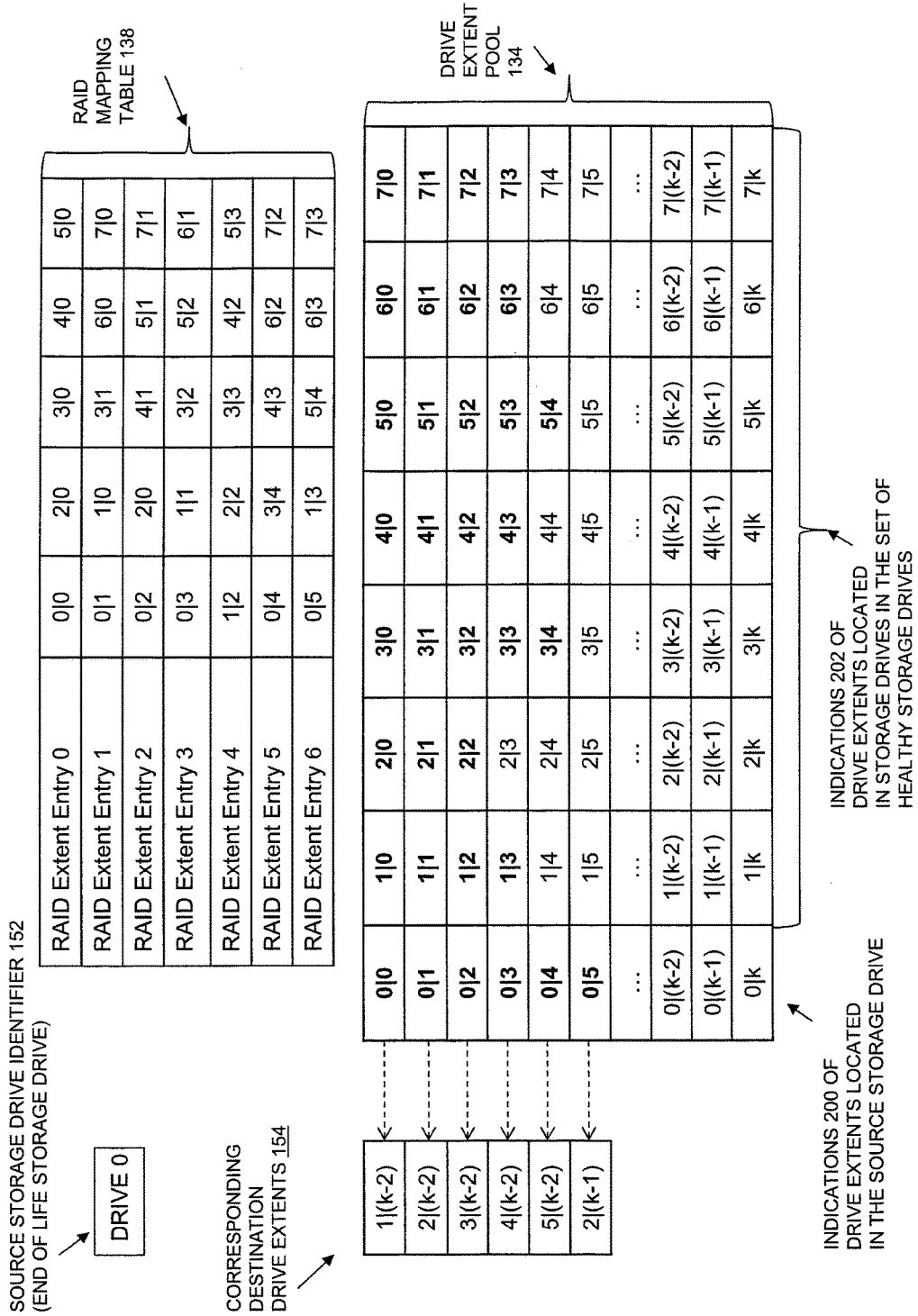
FIG. 2 is a block diagram illustrating how corresponding destination drive extents are identified to replace drive extents located in a source storage drive in an example of a use case.

FIG. 2 shows an example of a use case illustrating how corresponding destination drive extents may be identified to replace drive extents located in Source Storage Drive 170. In the example of FIG. 2, RAID Mapping Table 138 includes seven RAID extent entries, RAID Extent Entry 0, RAID Extent Entry 1, RAID Extent Entry 2, RAID Extent Entry 3, RAID Extent Entry 4, RAID Extent Entry 5, and RAID Extent Entry 6. Each RAID extent entry in RAID Mapping Table 138 indicates five drive extents that have been allocated to that RAID extent entry, as in a configuration that uses 4D+1P RAID-5. Specifically, RAID Extent Entry 0 indicates drive extent 0|0, drive extent 2|0, drive extent 3|0, drive extent 4|0, and drive extent 5|0, RAID Extent Entry 1 indicates drive extent 0|1, drive extent 1|0, drive extent 3|1, drive extent 6|0, and drive extent 7|0, RAID Extent Entry 2 indicates drive extent 0|2, drive extent 2|0, drive extent 4|1, drive extent 5|1, and drive extent 7|1, RAID Extent Entry 3 indicates drive extent 0|3, drive extent 1|1, drive extent 3|2, drive extent 5|2, and drive extent 6|1, RAID Extent Entry 4 indicates drive extent 1|2, drive extent 2|2, drive extent 3|3, drive extent 4|2, and drive extent 5|3, RAID Extent Entry 5 indicates drive extent 0|4, drive extent 3|4, drive extent 4|3, drive extent 6|2, and drive extent 7|2, and RAID Extent Entry 6 indicates drive extent 0|5, drive extent 1|3, drive extent 5|4, drive extent 6|3, and drive extent 7|3.

In the example of FIG. 2, Drive Extent Pool 134 includes Indications 200 of Drive Extents Located in the Source Storage Drive 170, and Indications 202 of Drive Extents Located in Storage Drives in the Set of Healthy Storage Drives 172. Indications of drive extents in Drive Extent Pool 134 that are allocated to the RAID extent entries in RAID Mapping Table 138 are shown in bold type. In the example of FIG. 2, each storage drive is divided into k+1 drive extents, that are numbered 0 through k within each storage drive.

The Source Storage Drive Identifier 152 in FIG. 2 is shown to have the storage drive name "Drive 0" stored therein, indicating that an end of life indication has been received indicating that Drive 0 in the Group of Storage Drives 130 has entered the end of life state, and accordingly that Drive 0 in the Group of Storage Drives 130 is the source storage drive. Corresponding Destination Drive Extents 154 stores an indication of a destination drive extent 1|(k−2) corresponding to drive extent 0|0 in Source Storage Drive 170, an indication of a destination drive extent 2|(k−2) corresponding to drive extent 0|1 in Source Storage Drive 170, an indication of a destination drive extent 3|(k−2) corresponding to drive extent 0|2 in Source Storage Drive 170, an indication of a destination drive extent 4|(k−2) corresponding to drive extent 0|3 in Source Storage Drive 170, an indication of a destination drive extent 5|(k−2) corresponding to drive extent 0|4 in Source Storage Drive 170, and an indication of a destination drive extent 2|(k−1) corresponding to drive extent 0|5 in Source Storage Drive 170.

End of Life Copying Logic 150 identified the destination drive extents indicated by Corresponding Destination Drive Extents 154, and to which the data stored in the corresponding drive extents located in Source Storage Drive 170 is to be copied, by selecting, in a round robin manner, next storage drives from within the Set of Healthy Storage Drives 172, allocating a drive extent located in each selected storage drive from the Drive Extent Pool 134, and storing indications of the allocated drive extents into Corresponding Destination Drive Extents 154. For example, for an initial drive extent 0|0 located in Source Storage Drive 170, End of Life Copying Logic 150 identified and allocated a corresponding destination drive extent 1|(k−2) that is located in Drive 1, and stored the indication 1|(k−2) into an element of Corresponding Destination Drive Extents 154 that corresponds to the drive extent 0|0. For the next drive extent located in Source Storage Drive 170, e.g. for the drive extent 0|1, End of Life Copying Logic 150 selected Drive 2 as the next storage drive within the Set of Healthy Storage Drives 172, and then identified and allocated a corresponding destination drive extent 2|(k−2) that is located in Drive 2, and stored the indication 2|(k−2) into an element of Corresponding Destination Drive Extents 154 that corresponds to the drive extent 0|1.

For the next drive extent located in Source Storage Drive 170, e.g. for the drive extent 0|2, End of Life Copying Logic 150 selected Drive 3 as the next storage drive within the Set of Healthy Storage Drives 172, and then identified and allocated a corresponding destination drive extent 3|(k−2) that is located in Drive 3, and stored the indication 3|(k−2) into an element of Corresponding Destination Drive Extents 154 that corresponds to the drive extent 0|2.

For the next drive extent located in Source Storage Drive 170, e.g. for the drive extent 0|3, End of Life Copying Logic 150 selected Drive 4 as the next storage drive within the Set of Healthy Storage Drives 172, and then identified and allocated a corresponding destination drive extent 4|(k−2) that is located in Drive 4, and stored the indication 4|(k−2) into an element of Corresponding Destination Drive Extents 154 that corresponds to the drive extent 0|3.

For the next drive extent located in Source Storage Drive 170, e.g. for the drive extent 0|4, End of Life Copying Logic 150 selected Drive 5 as the next storage drive within the Set of Healthy Storage Drives 172, and then identified and allocated a corresponding destination drive extent 5|(k−2) that is located in Drive 5, and stored the indication 5|(k−2) into an element of Corresponding Destination Drive Extents 154 that corresponds to the drive extent 0|4.

For each one of drive extents 0|0, 0|1, 0|2, 0|3, and 0|4, the initially selected next storage drive did not contain any drive extent that had been allocated to the same RAID extent entry as the drive extent located in the Source Storage Drive 170. Specifically, no drive extent located in Drive 1 is allocated to the RAID extent entry to which drive extent 0|0 is allocated (RAID Extent Entry 0), no drive extent located in Drive 2 is allocated to the RAID extent entry to which drive extent 0|1 is allocated (RAID Extent Entry 1), no drive extent located in Drive 3 is allocated to the RAID extent entry to which drive extent 0|2 is allocated (RAID Extent Entry 2), no drive extent located in Drive 4 is allocated to the RAID extent entry to which drive extent 0|3 is allocated (RAID Extent Entry 3), and no drive extent located in Drive 5 is allocated to the RAID extent entry to which drive extent 0|4 is allocated (RAID Extent Entry 5). However, when identifying a corresponding destination drive extent for drive extent 0|5, End of Life Copying Logic 150 initially selected Drive 6 as the next storage drive in the Set of Healthy Storage Drives 172 (after drive extent 5|(k−2) was identified and allocated), and detected that a drive extent located in Drive 6 had been allocated to the RAID extent entry to which drive extent 0|5 had also been allocated. Specifically, End of Life Copying Logic 150 detected that drive extent 6|3 had been allocated to RAID Extent Entry 6, to which drive extent 0|5 had also been allocated. Since two drive extents located on the same storage drive cannot be allocated to the same RAID extent entry, End of Life Copying Logic 150 then selected the next storage drive after Drive 6 in the Set of Healthy Storage Drives 172. i.e. Drive 7. However, End of Life Copying Logic 150 detected that a drive extent located in Drive 7 had been allocated to the RAID extent entry to which drive extent 0|5 had also been allocated. Specifically, End of Life Copying Logic 150 detected that drive extent 7|3 had been allocated to RAID Extent Entry 6, to which drive extent 0|5 had also been allocated. End of Life Copying Logic 150 then selected the next storage drive after Drive 7 in the Set of Healthy Storage Drives 172. i.e. Drive 1. Again, End of Life Copying Logic 150 detected that a drive extent located in Drive 1 had been allocated to the RAID extent entry to which drive extent 0|5 had also been allocated. Specifically, End of Life Copying Logic 150 detected that drive extent 1|3 had been allocated to RAID Extent Entry 6, to which drive extent 0|5 had also been allocated. End of Life Copying Logic 150 then selected the next storage drive after Drive 1 in the Set of Healthy Storage Drives 172. i.e. Drive 2. Because no drive extent located in Drive 2 had been allocated to RAID Extent Entry 6, End of Life Copying Logic 150 identified and allocated a corresponding destination drive extent 2|(k−1) that is located in Drive 2, and stored the indication 2|(k−1) into an element of Corresponding Destination Drive Extents 154 that corresponds to the drive extent 0|5.

Figure 3:
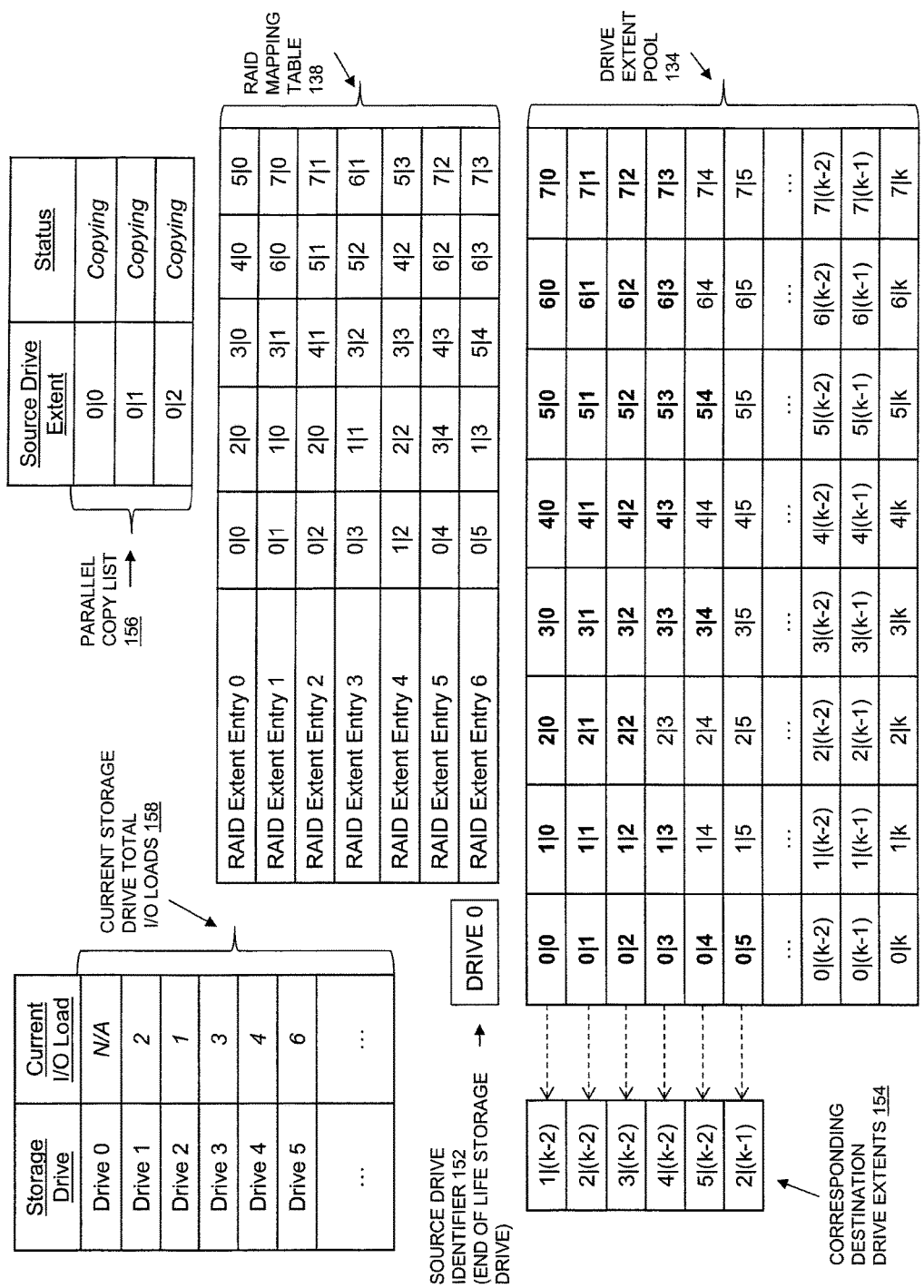
FIG. 3 is a block diagram further illustrating the use case of FIG. 2, and illustrates how after corresponding destination drive extents have been identified to replace drive extents located in the source storage drive, a parallel copy list can be generated that indicates drive extents located in the source storage drive from which data is copied in parallel by the storage processor to corresponding destination drive extents.

FIG. 3 is a first block diagram further illustrating the use case of FIG. 2. FIG. 3 illustrates how after the corresponding destination drive extents have been identified to replace drive extents located in the source storage drive, and indications of those corresponding destination drive extents have been stored into Corresponding Destination Drive Extents 154, Parallel Copy List 156 can be generated by End of Life Copying Logic 150 to indicate the drive extents located in the source storage drive from which data is to be copied in parallel to the corresponding destination drive extents. In the example of FIG. 3, indications of drive extents 0|0, 0|1, and 0|2 have previously been stored into Parallel Copy List 156. At some point in time while data is being copied in parallel from each of drive extents 0|0, 0|1, and 0|2 to the corresponding destination drive extents (e.g. destination drive extents 1|(k−2), 2|(k−2), and 3|(k−2)), Current Storage Drive Total I/O Loads 158 indicates the total number of I/O operations currently being processed by each one of the storage drives in the Set of Healthy Storage Drives 172. The total number of I/O operations currently being processed by each storage drive in the Set of Healthy Storage Drives 172 includes both i) host I/O operations (e.g. Host I/O Operations 112 shown in FIG. 1), and ii) background I/O operations (e.g. background copy operations performed in parallel by Parallel Copy Logic 164 in response to the contents of the Parallel Copy List 156). The background I/O operations may be performed at a lower priority level than the host I/O operations. In the example of FIG. 3, at some point in time while data is being copied in parallel from each of drive extents 0|0, 0|1, and 0|2 to the corresponding destination drive extents, a total number of I/O operations currently being processed by Drive 1 is 2, a total number of I/O operations currently being processed by Drive 2 is 1, a total number of I/O operations currently being processed by Drive 3 is 3, a total number of I/O operations currently being processed by Drive 4 is 4, and a total number of I/O operations currently being processed by Drive 5 is 6.

Figure 4:
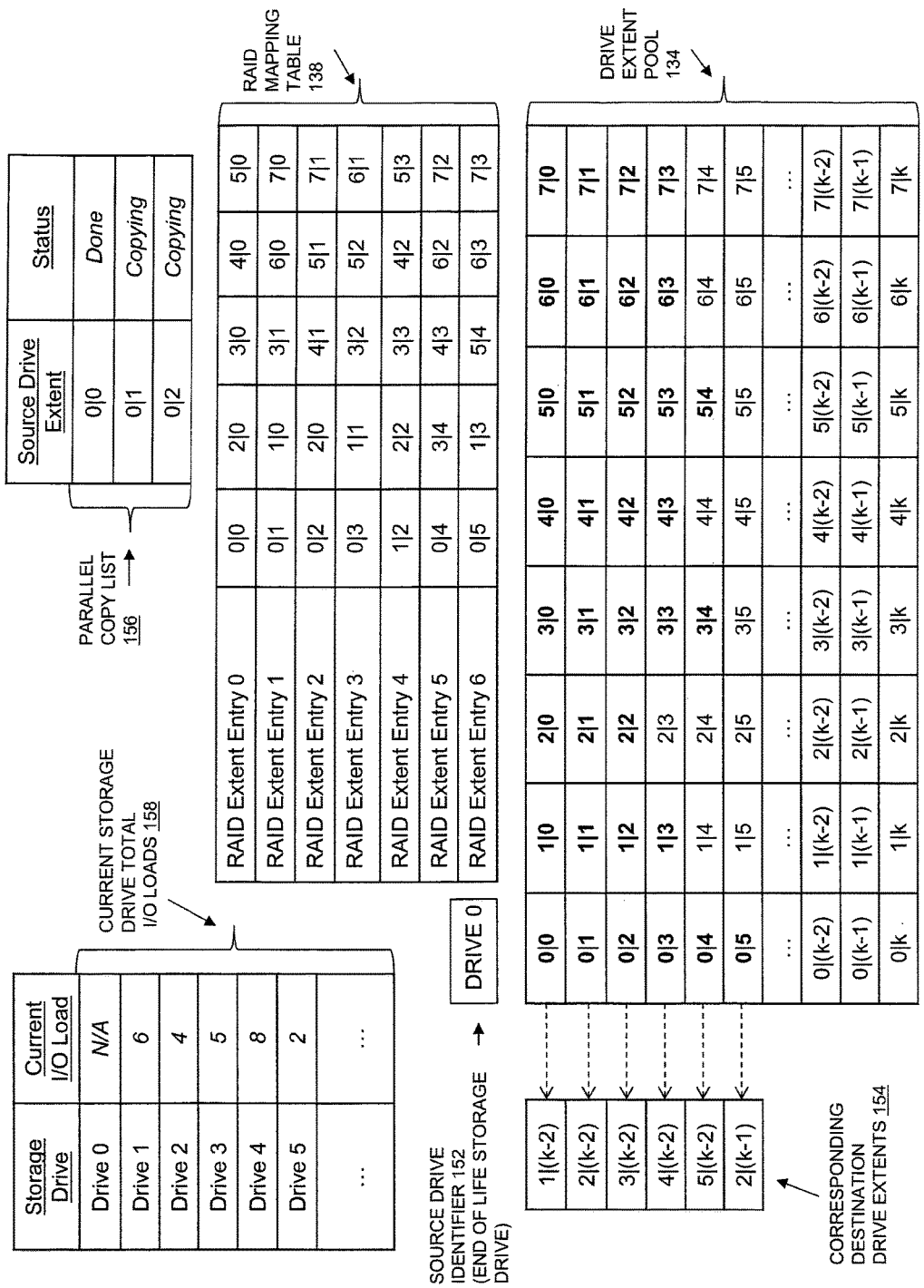
FIG. 4 is a block diagram further illustrating the use case of FIGS. 2-3, and showing how an indication of a drive extent located in the source storage drive may added to the parallel copy list after completion of a background copy operation.

FIG. 4 is a second block diagram further illustrating the use case shown in FIGS. 2 and 3. In the example of FIG. 4, some amount of time has elapsed since the example shown in FIG. 3. During the time that has elapsed since the example of FIG. 3, data was copied in parallel from each of the drive extents 0|0, 0|1, and 0|2 to the respective corresponding destination drive extents, and the copying of data from drive extent 0|0 to its corresponding destination drive extent 1|(k−2) has completed, i.e. all data stored in drive extent 0|0 has been successfully copied to the destination drive extent 1|(k−2). The status of the copy operations between drive extent 0|0 and destination drive extent 1|(k−2) has accordingly changed from Copying to Done. However, copying of data from drive extents 0|1 and 0|2 has not yet completed. End of Life Copying Logic 150 detects that copying of data from drive extent 0|0 to drive extent 1|(k−2) has completed, and accordingly that Parallel Copy List 156 is no longer full. In response to detecting that Parallel Copy List 156 is no longer full, End of Life Copying Logic 150 determines the current total I/O load for each storage drive in the Set of Healthy Storage Drives 172 at the time that Parallel Copy List 156 became no longer full, e.g. as indicated by the updated values in Current Storage Drive Total I/O Loads 158. End of Life Copying Logic 150 then identifies a storage drive in the Set of Healthy Storage Drives 172 that has a lowest current total I/O load. Rather than simply adding an indication of the next drive extent in Source Storage Drive 170 that needs copying (e.g. drive extent 0|3) to replace the indication of drive extent 0|0, Parallel Copy List 156 identifies a drive extent located in Source Storage Drive 170 that corresponds to a destination drive extent that is located in the storage drive that has the lowest current total I/O load of all the storage drives in the Set of Healthy Storage Drives 172. In the example of FIG. 4, End of Life Copying Logic 150 identifies Drive 5 as having the lowest current total I/O load of all the storage drives in the Set of Healthy Storage Drives 172, e.g. 2. End of Life Copying Logic 150 then adds, to the Parallel Copy List 156, an indication of a drive extent located in Source Storage Drive 170 that corresponds to a destination drive extent that is located in the storage drive that has the lowest current total I/O load of the storage drives in the Set of Healthy Storage Drives 172, e.g. an indication of a drive extent located in Source Storage Drive 170 that corresponds to a destination drive extent that is located on Drive 5. For example, End of Life Copying Logic 150 adds an indication of drive extent 0|4 to Parallel Copy List 156, since the corresponding destination drive extent for drive extent 0|4 is 5|(k−2), which is located in Drive 5. By avoiding simply adding an indication of drive extent 0|3 to Parallel Copy List 156 to replace the indication of drive extent 0|0, End of Life Copying Logic 150 advantageously avoids adding more load to Drive 4, which at the time End of Life Copying Logic 150 detected that Parallel Copy List 156 is not full is the storage drive with the heaviest current total I/O load, and instead efficiently adds load to the least currently loaded storage drive in the Set of Healthy Storage Drives 172.

Figure 5:
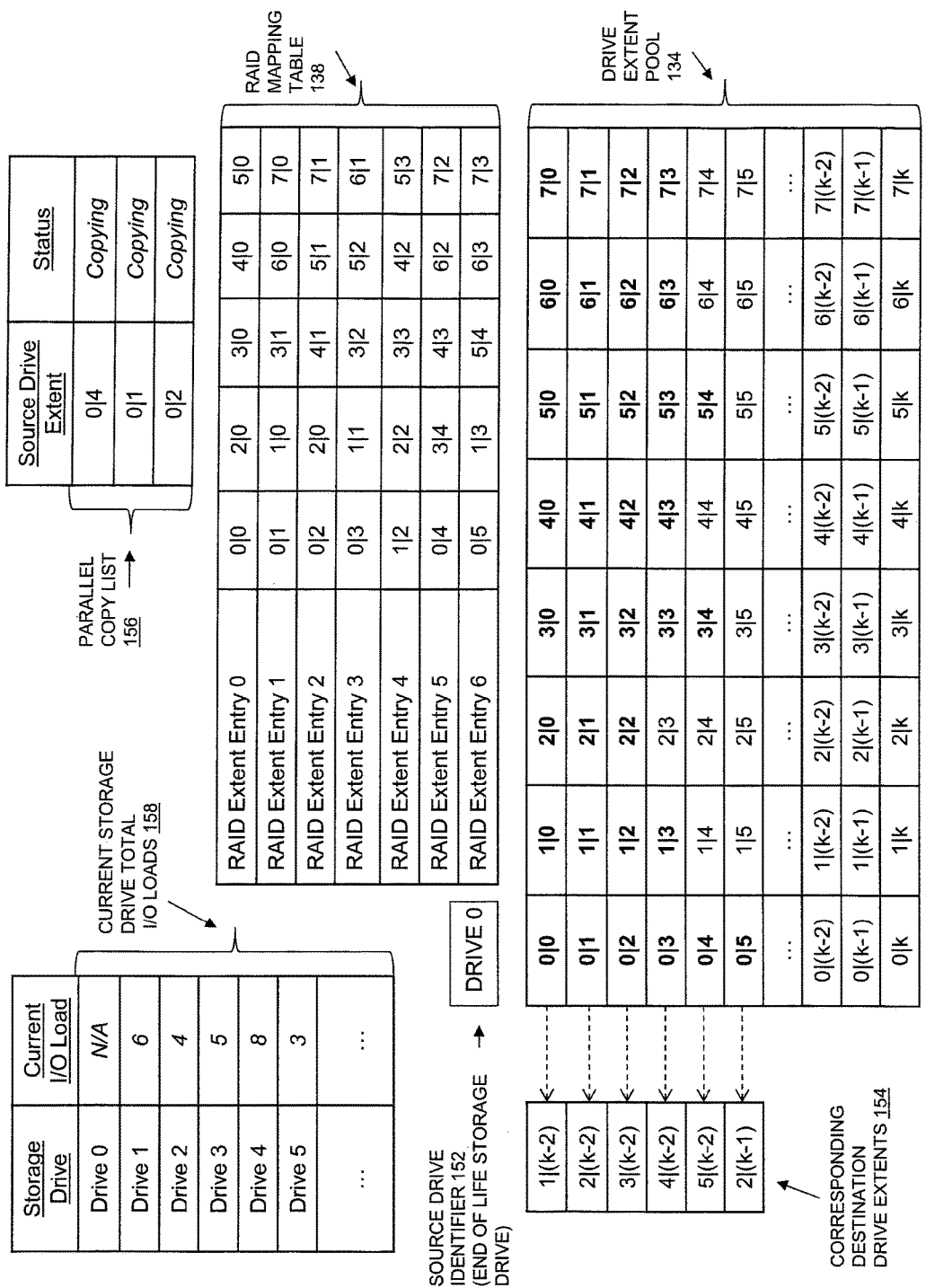
FIG. 5 is a third block diagram further illustrating the use case of FIGS. 2-4, and showing the result of adding the indication of the drive extent located in the source storage drive to the parallel copy list.

FIG. 5 is a third block diagram further illustrating the use case of FIGS. 2-4, and shows the result of End of Life Copying Logic 150 adding an indication of drive extent 0|4 to Parallel Copy List 156. Also shown in FIG. 5 is the result of End of Life Copying Logic 150 incrementing the current total I/O load for Drive 5 in Current Storage Drive Total I/O Loads 158, to reflect the addition of the indication of drive extent 0|4 to Parallel Copy List 156, since adding the indication of drive extent 0|4 to Parallel Copy List 156 causes a background data copy operation to be performed between drive extent 0|4 and the corresponding destination drive extent 5|(k−2), which is located on Drive 5, thus increasing the current total I/O load on Drive 5. FIG. 5 specifically shows that the total I/O load for Drive 5 has been increased from 2 to 3 as a result of adding the indication of drive extent 0|4 to the Parallel Copy List 156.

Figure 6:
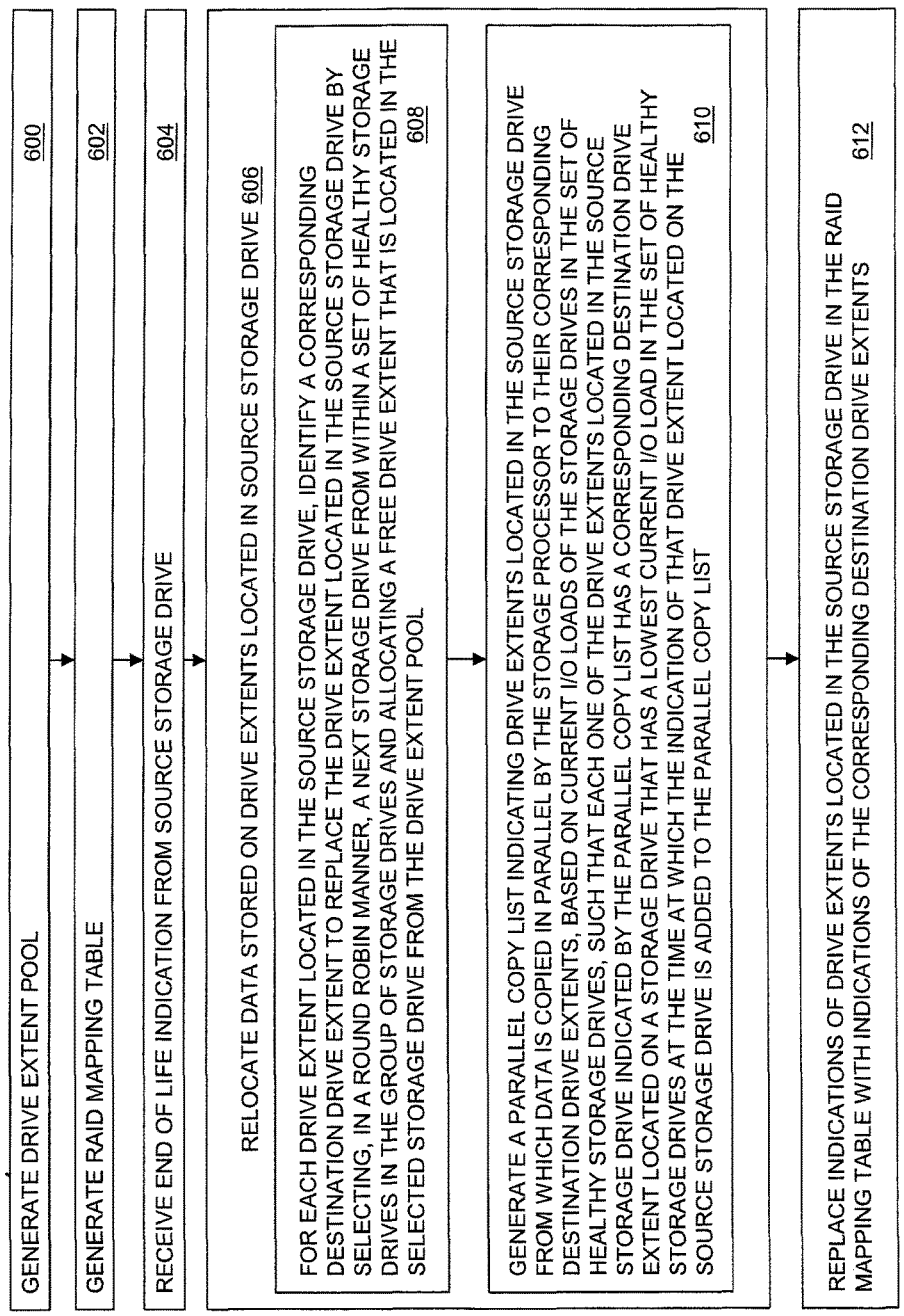
FIG. 6 is a flow chart illustrating steps performed in some embodiments to relocate data stored in drive extents located in a source storage drive from which an end of life indication has been received.

FIG. 6 is a flow chart illustrating steps performed in some embodiments to relocate data stored in drive extents located in a source storage drive from which an end of life indication has been received.

At step 600, a drive extent pool is generated, such as the Drive Extent Pool 134 shown in FIG. 1.

At step 602, a RAID mapping table is generated, such as the RAID Mapping Table 138 shown in FIG. 1.

At step 604, an end of life indication is received from a storage drive, such as the Drive End of Life Message 168 shown in FIG. 1. The end of life indication received at step 604 identifies a storage drive that has reached the end of life state, and that accordingly needs to be replaced. The storage drive that has reached the end of life state is the source storage drive for purposes of the data relocation performed in step 606. Step 606 is performed in response to receipt of the end of life indication at step 604.

At step 606, data stored in drive extents located in the source storage drive is relocated to drive extents located in a set of healthy storage drives. Step 606 includes steps 608 and 610. Step 606 is followed by step 612.

In step 608, for each drive extent located in the source storage drive, a corresponding destination drive extent is identified to replace the drive extent located in the source storage drive. The corresponding destination drive extent is identified by selecting, in a round robin manner, a next storage drive from within the set of healthy storage drives in the group of storage drives and allocating a drive extent that is located in the selected storage drive from the drive extent pool. An indication of each destination drive extent is stored in a list of corresponding destination drive extents.

In step 610, after a corresponding destination drive extent is identified in step 608 for each drive extent located in the source storage drive (e.g. for each allocated drive extent located in the source storage drive), and indications of the identified destination drive extents have been stored into the list of corresponding destination drive extents, a parallel copy list indicating drive extents located in the source storage drive is generated. Data is copied in parallel by the storage processor from the drive extents located in the source storage drive that are indicated in the parallel copy list to the corresponding destination drive extents. Indications of drive extents located in the source storage drive are added to the parallel copy list based on current total I/O loads of the storage drives in the set of healthy storage drives. Each indication of a drive extent located in the source storage drive added to the parallel copy list indicates a drive extent located in the source storage drive that has a corresponding destination drive extent located on a storage drive in the set of healthy storage drives that has a lowest current total I/O load of the storage drives in the set of healthy storage drives at the time at which the indication of the drive extent located on the source storage drive is added to the parallel copy list.

In step 612 indications of drive extents located in the source storage drive that are contained in the RAID extent entries of the RAID mapping table are replaced with indications of the corresponding destination drive extents.

Figure 7:
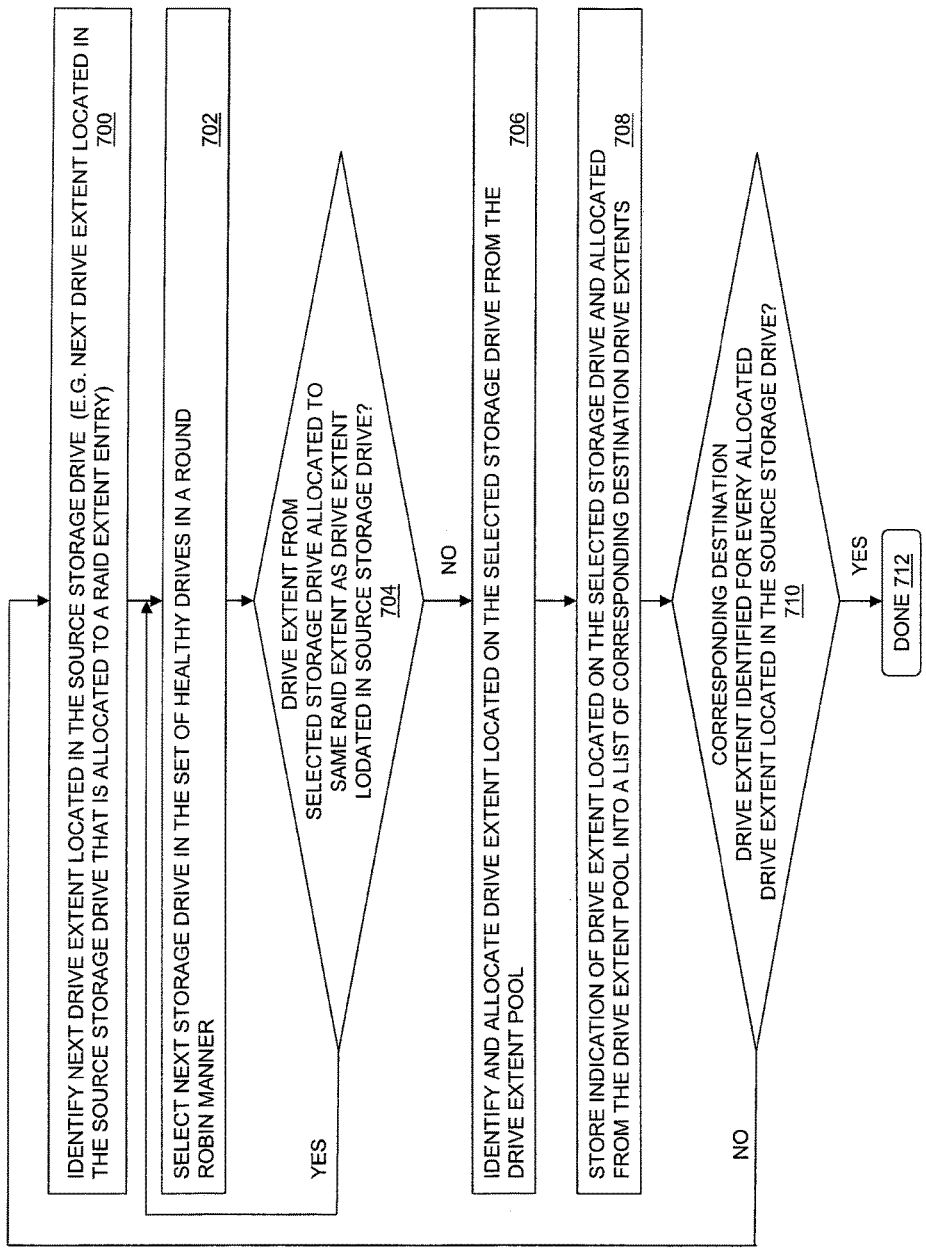
FIG. 7 is a flow chart illustrating steps performed in some embodiments to identify corresponding destination drive extents to replace drive extents located in the source storage drive by selecting storage drives from within a set of healthy storage drives in a round robin manner.

FIG. 7 is a flow chart illustrating steps performed in some embodiments to identify corresponding destination drive extents to replace drive extents located in the source storage drive by selecting storage drives from within a set of healthy storage drives in a round robin manner. The steps of FIG. 7 are performed in some embodiments to perform step 608 shown in FIG. 6.

At step 700, a next drive extent is identified that is located in the source storage drive (e.g. a next drive extent located in the source storage drive that is allocated to a RAID extent entry in the RAID mapping table), and for which a corresponding destination drive extent has not previously been identified.

At step 702 a next storage drive in the set of healthy drives is selected in a round robin manner, e.g. a next storage drive in the set of healthy storage drives is selected based on a predetermined ordering of the storage drives in the set of healthy drives, following the storage drive on which is located the destination drive extent that was last identified.

At step 704, a determination is made as to whether any drive extent located in the storage drive selected at step 702 is allocated to the same RAID extent entry as the drive extent located in the source storage drive identified at step 700. If so, then step 704 is followed by step 702, in which a storage drive is selected in the set of healthy storage drives that is the next storage drive following the storage drive previously selected at 702. Otherwise, step 704 is followed by step 706. Steps 702 and 704 are repeated until a storage drive in the set of healthy storage drives is selected on which there is no drive extent that is allocated to the same RAID extent entry to which the drive extent in the source storage drive identified at step 700 is allocated.

At step 706, a drive extent located on the storage drive selected from the set of healthy storage drives in step 702 is identified and allocated from the drive extent pool.

At step 708, an indication of the drive extent identified and allocated from the drive extent pool at step 706 is stored into a list of corresponding destination drive extents.

At step 710, a determination is made as to whether a corresponding destination drive extent has been identified and allocated for every drive extent located in the source storage drive that was allocated to a RAID extent entry in the RAID mapping table. If so, then step 710 is followed by step 712, and the steps of FIG. 7 are done. Otherwise, step 710 is followed by step 700, and steps 700 through 710 are repeated.

Figure 8:
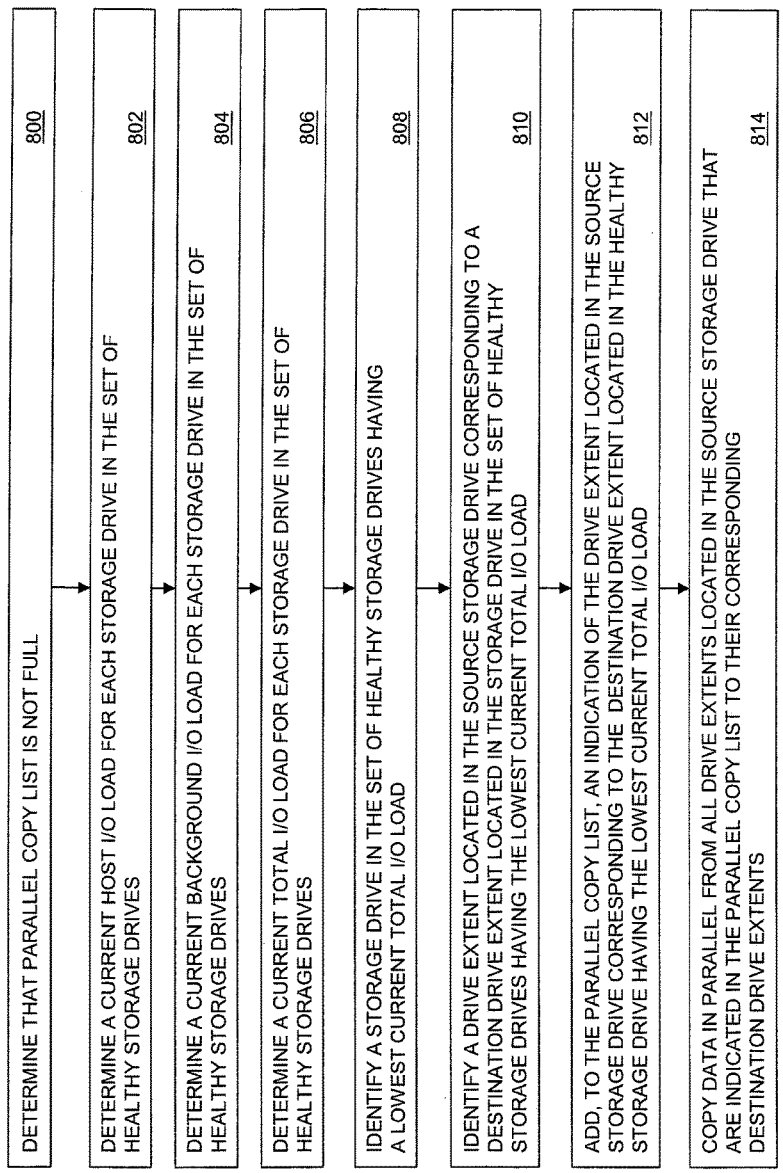
FIG. 8 is a flow chart illustrating steps performed in some embodiments to generate a parallel copy list indicating drive extents located in the source storage drive from which data is copied in parallel by the storage processor to the corresponding destination drive extents.

FIG. 8 is a flow chart illustrating steps performed in some embodiments to generate a parallel copy list indicating drive extents located in the source storage drive from which data is copied in parallel by the storage processor to corresponding destination drive extents. The steps of FIG. 8 are performed in some embodiments to perform step 610 of FIG. 6.

At step 800, a determination is made that the parallel copy list is not full.

At step 802, the current host I/O load for each storage drive in the set of healthy storage drives is determined.

At step 804, the current background I/O load for each storage drive in the set of healthy storage drives is determined.

At step 806, a current total I/O load for each storage drive in the set of healthy storage drives is determined that is equal to the sum of the current host I/O load and the current background I/O load for the storage drive.

At step 808 a storage drive is identified in the set of healthy storage drives that has the lowest current total I/O load of the storage drives in the set of healthy storage drives.

At 810, a drive extent is identified in the source storage drive corresponding to a destination drive extent located in the storage drive in the set of healthy storage drives having the lowest current total I/O load.

At step 812, an indication of the drive extent located in the source storage drive corresponding to the destination drive extent located in the healthy storage drive having the lowest current total I/O load is added to the parallel copy list.

At step 814, data is copied in parallel from all drive extents located in the source storage drive that are indicated in the parallel copy list to the corresponding destination drive extents.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of relocating data stored in a storage drive that is one of a group of storage drives communicably coupled to a storage processor in a data storage system that provides RAID (Redundant Array of Independent Disks) data protection for at least one storage object, the method comprising:

generating a drive extent pool from the storage drives communicably coupled to the storage processor, wherein the drive extent pool indicates a plurality of drive extents located in the storage drives, wherein each drive extent indicated by the drive extent pool comprises a contiguous region of non-volatile data storage located in one of the storage drives, and wherein each drive extent has a size equal to a predetermined drive extent size;

generating a RAID mapping table, wherein the RAID mapping table contains a plurality of RAID extent entries, wherein each RAID extent entry indicates a unique plurality of drive extents that are allocated from the drive extent pool to the RAID extent entry and that are used by the storage processor to persistently store host data written to a portion of an address space of the storage object corresponding to the RAID extent entry and associated parity data, and wherein each RAID extent entry indicates the same total number of drive extents;

in response to receiving an end of life indication from a source storage drive within the group of storage drives, relocating the data stored in the source storage drive by:

i) for each drive extent located in the source storage drive, identifying a corresponding destination drive extent to replace the drive extent located in the source storage drive by selecting, in a round robin manner, a next storage drive from within a set of healthy storage drives in the group of storage drives and allocating a free drive extent that is located in the selected storage drive from the drive extent pool, and ii) after a corresponding destination drive extent has been identified for each drive extent located in the source storage drive, generating a parallel copy list, wherein the parallel copy list indicates drive extents located in the source storage drive from which data is copied in parallel by the storage processor to the corresponding destination drive extents, wherein the parallel copy list is generated based on current total I/O loads of the storage drives in the set of healthy storage drives, and wherein each one of the drive extents located in the source storage drive indicated by the parallel copy list has a corresponding destination drive extent located on a healthy storage drive that has a lowest current total I/O load at a time at which the indication of that drive extent located on the source storage drive is added to the parallel copy list.

2. The method of claim 1, wherein generating the parallel copy list indicating drive extents located in the source storage drive from which data is copied by the storage processor in parallel to the corresponding destination drive extents further comprises:

detecting that the parallel copy list is not full; and responsive to detecting that the parallel copy list is not full, i) determining a current total I/O load for each storage drive in the set of healthy storage drives, ii) identifying a storage drive in the set of healthy storage drives having a lowest current total I/O load, iii) identifying a drive extent located in the source storage drive corresponding to a destination drive extent located in the healthy storage drive having the lowest current total I/O load, and iv) adding, to the parallel copy list, an indication of the drive extent located in the source storage drive corresponding to the destination drive extent located in the healthy storage drive having the lowest current total I/O load.

3. The method of claim 2, wherein determining the current total I/O load for each storage drive in the set of healthy storage drives further comprises:

for each storage drive in the set of healthy storage drives, determining a current host I/O load equal to a total number of host I/O operations currently being performed on the storage drive;

for each storage drive in the set of healthy storage drives, determining a current background I/O load equal to a total number of background I/O operations currently being performed on the storage drive, wherein the background I/O operations are performed at a lower priority than the host I/O operations, and wherein the background I/O operations include copy operations performed in parallel by the storage processor from drive extents located in the source storage drive and indicated by the parallel copy list to corresponding destination drive extents; and for each storage drive in the set of healthy storage drives, determining a current total I/O load that is equal to the sum of the current host I/O load for the storage drive and the current background I/O load for the storage drive.

4. The method of claim 1, wherein selecting, in a round robin manner, a next storage drive from within the set of healthy storage drives further comprises selecting a next storage drive in a predetermined sequential ordering of the set of healthy storage drives in following a storage drive on which is located the drive extent that was last allocated from the drive extent pool as a destination drive extent.

5. The method of claim 4, wherein the predetermined sequential ordering of the set of health storage drives comprises an order of slots into which the storage drives are connected within an array of storage drives that is communicably coupled to the storage processor.

6. The method of claim 5, wherein selecting, in a round robin manner, a next storage drive from within the set of healthy storage drives further comprises, before allocating a free drive extent that is located in an initially selected storage drive from the drive extent pool:
   determining whether any drive extent located in the initially selected storage drive was allocated to a RAID extent entry to which the drive extent located in the source storage drive was also allocated; and
   responsive to determining that a drive extent located in the initially selected storage drive was allocated to a RAID extent entry to which the drive extent located in the source storage drive was also allocated to the RAID extent entry in the RAID mapping table to which the drive extent located in the source storage drive was allocated, selecting a next storage drive in the predetermined sequential ordering of the set of healthy storage drives following the initially selected storage drive as the selected storage drive.

7. The method of claim 2, wherein detecting that the parallel copy list is not full comprises detecting that a background operation copying data from a drive extent located in the source storage drive indicated by the parallel copy list to the corresponding destination dive extent has completed.

8. The method of claim 7, wherein the end of life indication received from the source storage drive indicates that a threshold maximum number of reserved disk sectors in the source storage drive have been used to replace original disk sectors to which I/O operations were directed, in response to failures of the original disk sectors.

9. The method of claim 8, wherein the threshold maximum number of the reserved disk sectors comprises a total number of reserved disk sectors in the source storage drive.

10. A data storage system that provides RAID (Redundant Array of Independent Disks) data protection for at least one storage object, comprising:
   at least one storage processor including processing circuitry and a memory storing program code executable on the processing circuitry;
   at least one group of storage drives communicably coupled to the storage processor; and
   wherein the storage processor is configured and arranged to:
      generate a drive extent pool from the storage drives communicably coupled to the storage processor, wherein the drive extent pool indicates a plurality of drive extents located in the storage drives, wherein each drive extent indicated by the drive extent pool comprises a contiguous region of non-volatile data storage located in one of the storage drives, and wherein each drive extent has a size equal to a predetermined drive extent size;
      generate a RAID mapping table, wherein the RAID mapping table contains a plurality of RAID extent entries, wherein each RAID extent entry indicates a unique plurality of drive extents that are allocated from the drive extent pool to the RAID extent entry and that are used by the storage processor to persistently store host data written to a portion of an address space of the storage object corresponding to the RAID extent entry and associated parity data, and wherein each RAID extent entry indicates the same total number of drive extents;
      wherein to relocate data stored in a source storage drive within the group of storage drives in response to receiving an end of life indication from the source storage the storage processor is configured and arranged to:
         i) for each drive extent located in the source storage drive, identify a corresponding destination drive extent to replace the drive extent located in the source storage drive by selecting, in a round robin manner, a next storage drive from within a set of healthy storage drives in the group of storage drives and allocating a free drive extent that is located in the selected storage drive from the drive extent pool, and
         ii) after a corresponding destination drive extent has been identified for each drive extent located in the source storage drive, generate a parallel copy list, wherein the parallel copy list indicates drive extents located in the source storage drive from which data is copied in parallel by the storage processor to the corresponding destination drive extents, wherein the parallel copy list is generated based on current total I/O loads of the storage drives in the set of healthy storage drives, wherein each one of the drive extents located in the source storage drive indicated by the parallel copy list has a corresponding destination drive extent located on a storage drive that has a lowest current total I/O load at a time at which the indication of that drive extent located on the source storage drive is added to the parallel copy list.

11. The data storage system of claim 10, wherein to generate the parallel copy list indicating drive extents located in the source storage drive from which data is copied by the storage processor in parallel to the corresponding destination drive extents the storage processor is further configured and arranged to:

detect that the parallel copy list is not full; and
responsive to detecting that the parallel copy list is not full, i) determine a current total I/O load for each storage drive in the set of healthy storage drives, ii) identify a storage drive in the set of healthy storage drives having a lowest current total I/O load, iii) identify a drive extent located in the source storage drive corresponding to a destination drive extent located in the storage drive having the lowest current total I/O load, and iv) add, to the parallel copy list, an indication of the drive extent located in the source storage drive corresponding to the destination drive extent located in the storage drive having the lowest current total I/O load.

12. The data storage system of claim 11, wherein to determine the current total I/O load for each storage drive in the set of healthy storage drives the storage processor is further configured and arranged to:
for each storage drive in the set of healthy storage drives, determine a current host I/O load equal to a total number of host I/O operations currently being performed on the storage drive;
for each storage drive in the set of healthy storage drives, determine a current background I/O load equal to a total number of background I/O operations currently being performed on the storage drive, wherein the background I/O operations are performed at a lower priority than the host I/O operations, and wherein the background I/O operations include background copy operations performed in parallel by the storage processor from drive extents located in the source storage drive and indicated by the parallel copy list to corresponding destination drive extents; and
for each storage drive in the set of healthy storage drives, determine a current total I/O load that is equal to the sum of the current host I/O load for the storage drive and the current background I/O load for the storage drive.

13. The data storage system of claim 10, wherein to select, in a round robin manner, a next storage drive from within the set of healthy storage drives, the storage processor is configured and arranged to identify a next storage drive in a predetermined sequential ordering of the set of healthy storage drives following a storage drive on which is located the drive extent that was last allocated from the drive extent pool as a destination drive extent.

14. The data storage system of claim 13, wherein the predetermined sequential ordering of the set of healthy storage drives in the group of storage drives comprises an order of slots into which the storage drives are connected within an array of storage drives that is communicably coupled to the storage processor.

15. The data storage system of claim 14, wherein to select, in a round robin manner, a next storage drive from within the set of healthy storage drives the storage processor is further configured and arranged to, before allocating a free drive extent that is located in an initially selected storage drive from the drive extent pool:
determine whether any drive extent located in the initially selected storage drive was allocated to a RAID extent entry to which the drive extent located in the source storage drive was also allocated; and
responsive to a determination that a drive extent located in the initially selected storage drive was allocated to a RAID extent entry to which the drive extent located in the source storage drive was also allocated, select a next storage drive in the predetermined sequential ordering of the set of healthy storage drives in the group of storage drives following the initially selected storage drive as the selected storage drive.

16. The data storage system of claim 11, wherein to detect that the parallel copy list is not full the storage processor is further configured and arranged to detect that a background operation copying data from a drive extent located in the source storage drive indicated by the parallel copy list to the corresponding destination dive extent has completed.

17. The data storage system of claim 16, wherein the end of life indication received from the source storage drive indicates that a threshold maximum number of reserved disk sectors in the source storage drive have been used to replace original disk sectors to which I/O operations were directed, in response to failures of the original disk sectors.

18. The data storage system of claim 17, wherein the threshold maximum number of the reserved disk sectors comprises a total number of reserved disk sectors in the source storage drive.

19. A non-transitory computer readable medium for relocating data stored in a storage drive that is one of a group of storage drives communicably coupled to a storage processor in a data storage system that provides RAID (Redundant Array of Independent Disks) data protection for at least one storage object, comprising instructions stored thereon, that when executed on processing circuitry in a storage processor, perform the steps of:
generating a drive extent pool from the storage drives communicably coupled to the storage processor, wherein the drive extent pool indicates a plurality of drive extents located in the storage drives, wherein each drive extent indicated by the drive extent pool comprises a contiguous region of non-volatile data storage located in one of the storage drives, and wherein each drive extent has a size equal to a predetermined drive extent size;
generating a RAID mapping table, wherein the RAID mapping table contains a plurality of RAID extent entries, wherein each RAID extent entry indicates a unique plurality of drive extents that are allocated from the drive extent pool to the RAID extent entry and that are used by the storage processor to persistently store host data written to a portion of an address space of the storage object corresponding to the RAID extent entry and associated parity data, and wherein each RAID extent entry indicates the same total number of drive extents;
in response to receiving an end of life indication from a source storage drive within the group of storage drives, relocating the data stored in the source storage drive by:
i) for each drive extent located in the source storage drive, identifying a corresponding destination drive extent to replace the drive extent located in the source storage drive by selecting, in a round robin manner, a next storage drive from within a set of healthy storage drives in the group of storage drives and allocating a free drive extent that is located in the selected storage drive from the drive extent pool, and
ii) after a corresponding destination drive extent has been identified for each drive extent located in the source storage drive, generating a parallel copy list, wherein the parallel copy list indicates drive extents located in the source storage drive from which data is copied in parallel by the storage processor to the corresponding destination drive extents, wherein the parallel copy list is generated based on current total I/O loads of the storage drives in the set of healthy storage drives, wherein each one of the drive extents located in the source storage drive indicated by the parallel copy list has a corresponding destination drive extent located on a storage drive having a lowest current total I/O load at a time at which the indication of that drive extent located on the source storage drive is added to the parallel copy list.

\* \* \* \* \*